United States Patent [19]
Amisano et al.

[11] Patent Number: 5,908,460
[45] Date of Patent: Jun. 1, 1999

[54] DEVICE AND METHOD FOR TRANSMISSION CONTROL

[75] Inventors: Fabrizio Amisano; Francesco Cimmino, both of Turin; Giovanni Tornatore, S. Benigno Canavese; Giorgio Alotto, Condove; Andrea Baldasso, Turin, all of Italy

[73] Assignee: Magneti Marelli S.P.A., Milan, Italy

[21] Appl. No.: 08/824,315

[22] Filed: Mar. 26, 1997

[30] Foreign Application Priority Data

Mar. 29, 1996 [IT] Italy ................................. TO96A0242

[51] Int. Cl.⁶ ..................................................... G06G 7/70
[52] U.S. Cl. ................................ 701/51; 701/67; 701/68; 701/33
[58] Field of Search ..................... 701/51, 52, 53, 701/58, 59, 60, 61; 395/182.02, 182.1, 182.04, 182.09, 184.01, 185.08, 182.18, 182.11; 364/130, 131, 132, 133

[56] References Cited

U.S. PATENT DOCUMENTS

| | | | |
|---|---|---|---|
| 4,558,416 | 12/1985 | Pauwels et al. | 701/114 |
| 4,872,106 | 10/1989 | Slater | 395/182.11 |
| 4,962,680 | 10/1990 | Kirstein | 701/114 |
| 5,142,474 | 8/1992 | Miyata et al. | 701/33 |
| 5,216,938 | 6/1993 | Yamaguchi | 701/53 |
| 5,274,554 | 12/1993 | Takats et al. | 701/33 |
| 5,418,937 | 5/1995 | Inoue | 395/184.01 |
| 5,491,787 | 2/1996 | Hashemi | 395/182.09 |
| 5,754,780 | 5/1998 | Asakawa et al. | 395/200.38 |

FOREIGN PATENT DOCUMENTS

| | | |
|---|---|---|
| 0444676 | 9/1991 | European Pat. Off. |
| 05203036 | 11/1993 | Japan. |
| 2191875 | 12/1987 | United Kingdom. |
| WO96/25612 | 8/1996 | WIPO. |

Primary Examiner—Jacques H. Louis-Jacques
Attorney, Agent, or Firm—Baker & Daniels

[57] ABSTRACT

Control device for a transmission unit comprising a clutch and a gear shift which are coupled respectively to a first and a second actuator unit in order to operate the actuation of the clutch and the selection and engagement/disengagement of the gears. The device comprises a transmission control circuit in which a main microprocessor formulates control signals for the first and second actuator unit and an auxiliary microprocessor determines a state of malfunctioning of the main microprocessor in order to transfer the control of the transmission unit to the auxiliary microprocessor in the event of a fault.

17 Claims, 2 Drawing Sheets

FIG_1

1

DEVICE AND METHOD FOR TRANSMISSION CONTROL

BACKGROUND OF THE INVENTION

The present invention relates to a device and a method for transmission control.

Control devices for vehicle transmission units are known, in which an electronic circuit supplies control signals for a first and a second actuator unit which are able to operate, respectively, the actuation of a clutch and the selection and engagement/disengagement of the gears of a shift associated with this clutch. The known electronic circuits comprise at least one microprocessor which generates the clutch and shift actuation signals on the basis of a plurality of input signals, for example representative of a manually selected gear, of the working conditions of the engine, etc.

In the event of a malfunctioning of the microprocessor, the control signals may be completely lacking or may be generated in an entirely chance manner making the transmission unit unusable and giving rise, as a consequence, to the unmanageability of the vehicle. In particular, in the event of a malfunctioning of the microprocessor while the vehicle is travelling at high speed, any failing in traction due to the accidental opening of the clutch or to the accidental disengaging of the engaged gear, may give rise to the loss of control of the vehicle. Similar considerations may hold in the event of a malfunctioning of the microprocessor while the vehicle is travelling along a steeply descending stretch of road.

SUMMARY OF THE INVENTION

The object of the present invention is to produce a transmission control device which overcomes the drawbacks of the known devices.

The above object is achieved by the present invention as the latter relates to a transmission control device of the type described in claim 1. The present invention furthermore relates to a method of transmission control of the type described in claim 14.

BRIEF DESCRIPTION OF THE DRAWINGS

The invention will now be illustrated with reference to the appended drawings which represent a preferred non-limiting embodiment in which.

DETAILED DESCRIPTION OF THE INVENTION

Figure 1:
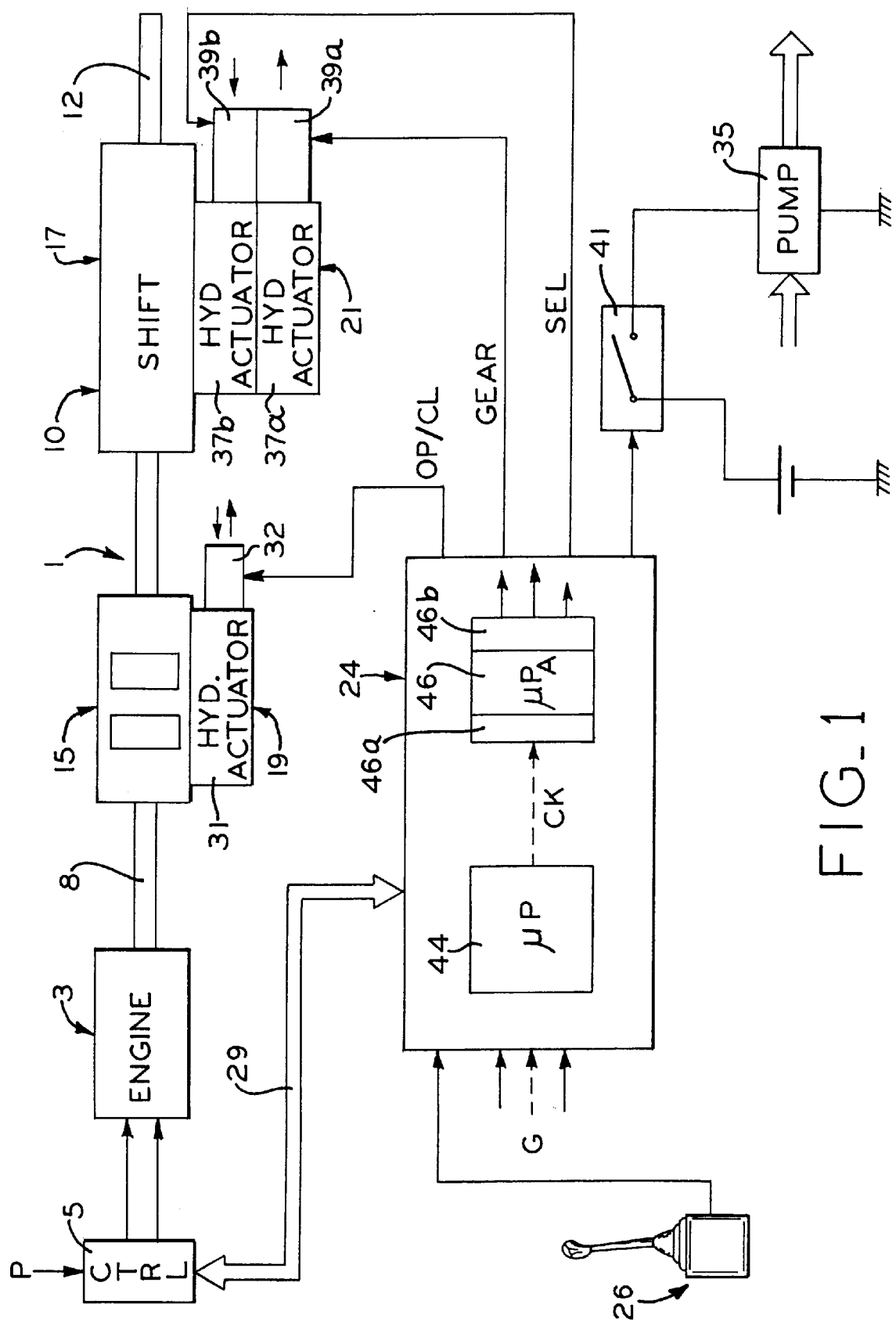
FIG. 1 represents, schematically, an internal combustion engine of a vehicle coupled with a transmission unit cooperating with a transmission control device produced according to the dictates of the present invention.

With particular reference to FIG. 1, a transmission control device is indicated 1, as a whole, cooperating with an internal combustion engine 3, for example a petrol engine or a diesel engine. The engine 3 cooperates with an electronic engine-control facility 5 which receives as input a plurality of information parameters P measured mainly in the engine 3 and supplies control signals for the ignition system (not illustrated) and an injection system (not illustrated) of the engine 3.

The engine 3 has an output shaft 8 able to provide mechanical power to the input of a transmission unit 10 having an output shaft 12 able to transmit mechanical power to the wheels of a motor vehicle (not represented). The transmission unit 10 comprises a clutch 15 input-connected to the shaft 8 and a shift 17 input-connected to the output shaft of the said clutch 15. The transmission unit 10 furthermore comprises a first actuator unit 19 (represented schematically) for opening and closing the clutch 15 and a second actuator unit 21 for operating the selection and engagement/disengagement of the gears of the shift 17.

The transmission unit 10 cooperates with a transmission control circuit 24 able to formulate a plurality of input signals G and able to control the first and the second actuator unit 19, 21 for the selection and meshing/unmeshing of the gears. For example, the control circuit 24 can receive input signals from a manually actuatable selector device 26 usable for the selection of the gears. The transmission control circuit 24 furthermore cooperates with the engine control facility 5 to which it is connected via a bidirectional data transmission line (BUS) 29.

In particular, the first actuator unit 19 comprises a hydraulic actuator 31 coupled with an electric control valve 32 receiving pressurized oil from an electric pump 35. The hydraulic actuator 31 is able to actuate, in a known manner, the clutch 15, opening or closing the clutch 15 on the basis of an electrical control signal OP/CL supplied to the electric valve 32 from the circuit 24. The actuator unit 21 comprises two double-action hydraulic actuators 37a, 37b coupled with respective control valve devices 39a, 39b receiving pressurized oil from the electric pump 35. The actuator unit 21 is able, in a known manner and on the basis of a control signal GEAR supplied to the valve device 39a, to engage/disengage the gears of the shift 17 and is furthermore able, in a known manner on the basis of a command SEL supplied to the valve device 39b, to select the setting of the gears of the shift 17.

The transmission control circuit 24 furthermore controls a relay 41 for energizing the electric pump 35. According to the present invention the transmission control circuit 24 comprises a first microprocessor 44 and an auxiliary microprocessor 46 working together according to the procedures which will be made clearer subsequently with the help of FIG. 2.

Figure 2:
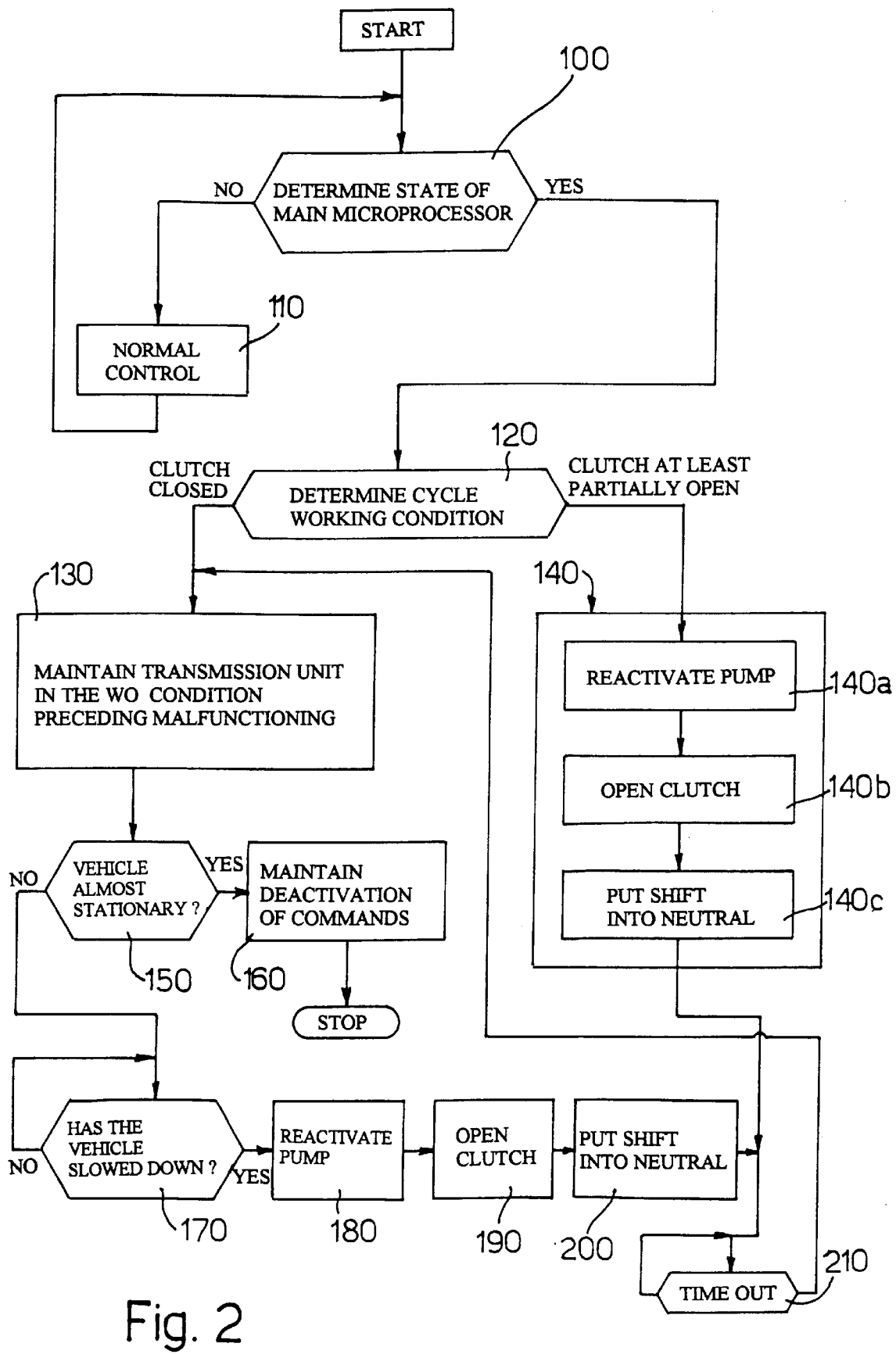
FIG. 2 represents a logic diagram with operating blocks of the transmission control device of FIG. 1.

FIG. 2 illustrates a preferred example of the operation of the transmission control circuit 24 working in accordance with the present invention.

To start with there is a block 100 in which the auxiliary microprocessor 46 determines the state of operation of the main microprocessor 44, for example by monitoring a CLOCK signal CK from the main microprocessor 44. In the event that the monitored state of operation corresponds to normal operation of the main microprocessor 44 (for example in the event that the CLOCK signal is present and regular) the block 100 is followed by a block 110, otherwise, in the event that a malfunctioning of the main microprocessor is determined, we go from block 100 to block 120. The state of malfunctioning can be determined, for example, in the event that the CLOCK signal is absent or irregular.

Block 110 carries out, in a known manner, control of the transmission unit 10 via the main microprocessor 44 and on the basis of the signals G supplied to the circuit 24 (and possibly of the state of the engine 3 as determined from the data coming through the data line 29). From block 110 we return to block 100, although remaining within the loop formed by the blocks 100, 110 so long as the main microprocessor 44 is operating correctly.

Block 120 transfers the control of the transmission unit 10 to the auxiliary microprocessor 46 and possibly generates a signal in order to execute a malfunctioning and danger signalling (optical, audible) addressed to the user of the vehicle (not illustrated). The auxiliary microprocessor 46 comprises a first data exchange interface 46*a* (illustrated in FIG. 1) receiving the signals identifying the state of malfunctioning of the microprocessor 44 and a second data exchange interface 46*b* (illustrated in FIG. 1) which is normally configured as an input interface (INPUT). With the determining of the state of malfunctioning the second interface 46*b* becomes configured as an output interface (OUTPUT) for the purpose of allowing the generation of control signals by the auxiliary microprocessor 46 heading for the transmission unit 10.

The auxiliary microprocessor 46 determines a first and a second working condition of the vehicle by observation of the state of the clutch 15 as prevailing before the determining of the malfunctioning. In particular, the block 120 determines a first working condition in which the clutch 15 is closed and the vehicle is proceeding normally or is stationary and a second working condition in which the clutch 15 is at least partially open and a shift of gear or a pull-away is in progress. In the event that the first working condition is determined the block 120 is followed by a block 130, otherwise, in the event of the determining of the second working condition the block 120 is followed by a block 140. The determining of the state of the clutch 15 can be undertaken by sequentially storing the clutch control signal OP/CL generated by the main microprocessor 44 and retrieving the last stored value of this signal before the determining of the malfunctioning. Alternatively, the determining of the state of the clutch can be carried out by determining the actual position of the clutch 15, for example with a position sensor (not illustrated) or by determining the strength of the control current of the electric valve 32.

The block 130 acts on the transmission unit 10 in order to maintain this unit in the working condition in use before the detection of the malfunctioning; in particular, the block 130 operates on the controls of the unit 10 in order to prevent the opening of the clutch 15 and the modifying of the currently set transmission ratio.

In particular, the block 130 controls:
the opening of the relay 41 so as to switch off the electric pump 35 thereby disabling the supply of pressurized oil to the actuator units 19 and 21;
the deactivation of the electric valve 32 so as to disable the hydraulic actuator 31 thereby preventing the actuation of the clutch 15; and
the deactivation of the valve devices 39*a*, 39*b* so as to disable the double-action hydraulic actuators 37*a*, 37*b* thereby preventing the actuation of the shift 17 and in particular the disengaging of the gears.

Block 130 is followed by a block 150 which checks whether the speed of the vehicle is below a near-zero threshold value; if so (vehicle stationary or almost stationary) block 150 is followed by a block 160, otherwise (vehicle moving with non-negligible speed) block 150 is followed by a block 170. Block 160 maintains the deactivation of the controls of the transmission unit 10 as done in block 130 and possibly sends a malfunctioning signalling (for example of the optical or acoustic type) to the driver of the vehicle.

Block 170 waits for the speed of the vehicle to drop below a preset threshold value corresponding to a safety speed; upon the reaching of this safety speed, we pass from block 170 to a block 180. Alternatively, block 170 may wait for the angular speed of the engine to drop below a preset threshold value corresponding to a safety rotation range; upon reaching this safety range, we pass from block 170 to block 180.

Block 180 commands the closure of the relay 41 in order to reactivate the electric pump 35 and resupply the actuator units 19 and 21 with pressurized oil. Block 180 is followed by a block 190 which commands the supplying to the electric valve 32 of an electrical signal able to effect the opening of the clutch 15. Block 190 is followed by a block 200 which commands the supplying to the valve devices 39*a*, 39*b* of a signal able to effect the putting into neutral of the shift 17. Block 200 is followed by a wait block 210 (TIME OUT) which effects a closed loop for a preset period of time T; on termination of the period T, we return from block 210 to block 130.

Block 140 comprises a block 140*a* which commands the closure of the relay 41 in order to reactivate the electric pump 35 (if deactivated by the faulty main microprocessor) and supply the actuator units 19 and 21 with pressurized oil. Block 140*a* is followed by a block 140*b* which commands the supplying to the electric valve 32 of an electrical signal able to effect the opening of the clutch 15. Block 140*b* is followed by a block 140*c* which sends the valve devices 39*a*, 39*b* a signal able to effect the putting into neutral of the shift 17. From block 140*c* we go to block 210.

In use, the malfunctioning of the main microprocessor 44 is immediately determined (block 100), transferring the control of the transmission unit 10 from the main microprocessor 44 (faulty) to the auxiliary microprocessor (block 120). Therefore, the state of the vehicle is monitored (block 120) and if the vehicle is stationary or is travelling along at normal speed, all the commands to the transmission unit 10 are removed (block 130) so as to prevent the vehicle from lacking traction (in the event that the vehicle is travelling along) or to prevent the starting of the vehicle (in the event that the vehicle is stationary). In the event that the vehicle is travelling along at normal speed, the slowing down of the vehicle is awaited (block 170) in order to reactivate the electric pump 35 (block 180), open the clutch (block 190) and put the shift into neutral (block 200). Therefore, the shift is put into neutral at low speed without the danger that the lack of traction might cause the loss of control of the vehicle. Subsequently, the vehicle stops, for example because the driver has actuated the brakes, and is no longer able to set off again (block 130). In the event that the malfunctioning of the main microprocessor occurs during a gear shift or a pull-away (block 120), the electric pump 35 is reactivated if it was switched off following the fault in the main microprocessor (block 140*a*). Following this, the microprocessor 46 commands the opening of the clutch (block 140*b*) and places the shift into neutral (block 140*c*).

From the foregoing it is clear how the device which is the subject of the present invention enables the transmission unit 10 to be placed in a safety condition following a fault in the main microprocessor.

Indeed, in the event of a fault, the following actions are possible:
if the vehicle is stationary and the clutch is closed (for example because the vehicle is stationary with the engine switched off), the following are prevented: the engaging or disengaging of the gears, the opening of the clutch and the generating of hydraulic power (blocks 130, 150, 160) and the consequent starting of the vehicle with the circuit 24 defective;
if the vehicle is moving and the clutch is closed, traction is maintained so long as the speed of the vehicle has not dropped below a safety threshold (blocks 130, 170)—this prevents lack of traction from being able to render the vehicle unmanageable;

if the vehicle is stationary and the clutch is open (for example while the vehicle is waiting at traffic lights), control of the pump is effected and so the clutch is opened and the shift put into neutral (block 140);

if the vehicle is moving at low speed, the clutch is opened and the shift is put into neutral (blocks 170, 180, 190 and 200); and if a gear shift or a pull-away is being operated, the shift is put into neutral (blocks 170, 180, 190 and 200).

Finally, it is clear that modifications and variants may be made to the device described and illustrated without however departing from the protective scope of the present invention.

For example, the main microprocessor 44 could in turn diagnose the state of operation of the secondary microprocessor 46 and in the event of a malfunctioning or defect in the secondary microprocessor 46, a signalling could be sent to the user of the vehicle.

We claim:

1. Electronic control device for a transmission unit comprising a clutch receiving mechanical power from an internal combustion engine and a gear shift input-connected to an output of said clutch to transfer mechanical power to the wheels of a vehicle, said transmission unit further comprising;

a first actuator unit coupled to said clutch to actuate said clutch;

a second actuator unit coupled to said gear shift to select and engage/disengage the gears of said gear shift;

electronic control means supplying control signals to said first and second actuator units based upon information signals supplied to said electronic control means;

said electronic control means comprising at least one main microprocessor to formulate said control signals;

said electronic control means comprising auxiliary microprocessor means to determine a malfunction of said main microprocessor, control of said transmission unit being transferred to said auxiliary microprocessor means upon the malfunction of said main microprocessor;

said auxiliary microprocessor means comprising first means of examination to determine the state of operation of said main microprocessor, said first means of examination selecting second means of examination if the determined state of operation corresponds to the malfunction of said main microprocessor;

said second means of examination determining at least a first and a second working condition of the vehicle existing before detection of said malfunction; and said clutch being closed in said first working condition and said clutch being at least partially open in said second working condition said electronic control means controlling said first and second actuator units in a manner depending on whether said clutch is closed or at least partially open.

2. Device according to claim 1, wherein said first means of examination monitors a CLOCK signal (CK) from said main microprocessor, whereby said malfunction is detected.

3. Device according to claim 1, wherein said second means of examination selects first and second means of control, corresponding with detection of said first and said second working conditions respectively; and said first means of control maintains said transmission unit in said first working condition.

4. Device according to claim 3, wherein said first means of control deactivates a generator means which powers said first and said second actuator units.

5. Device according to claim 3, wherein said first control means deactivates said first actuator unit, whereby actuation of said clutch is prevented; and said first control means deactivates said second actuator unit, whereby actuation of said gear shift is prevented.

6. Device according to claim 3, wherein said first control means selects comparator means which compares the speed of the vehicle with a first threshold value, said comparator means maintaining said transmission unit in whichever of said first and said second working conditions exists before detection of said malfunctioning if said vehicle speed is near said first threshold value.

7. Device according to claim 6, wherein said comparator means compares said speed with a second threshold value, said comparator means selecting uncoupling means when said speed reaches said second threshold value, said uncoupling means opening said clutch and placing said gear shift into neutral.

8. Device according to claim 7, wherein said uncoupling means comprises:

first redeployment means which reactivates said generator means, whereby power is supplied to said first and second actuator units;

first clutch control means which generates a control signal for said first actuator unit to open said clutch; and first shift control means which generates a control signal for said second actuator unit to place said gear shift into neutral.

9. Device according to claim 3, wherein said second control means opens said clutch and places said gear shift into neutral.

10. Device according to claim 9, wherein said second control means comprises:

second redeployment means to operate the reactivation of generator means of power for said first and said second actuator units;

second clutch control means to generate a control signal for said first actuator unit to open said clutch; and second shift control means to generate a control signal for said second actuator unit to place said gear shift into neutral.

11. Device according to claim 1, wherein said second means of examination sequentially stores a clutch control signal generated by said main microprocessor and retrieves the last stored value of said clutch control signal.

12. Device according to claim 1, wherein said auxiliary microprocessor means comprises a first data exchange interface receiving signals identifying said state of malfunctioning of the main microprocessor and a second data exchange interface which is normally configured as an input interface (INPUT, upon determining of said state of malfunctioning said second interface being reconfigured as an output interface (OUTPUT) for generating control signals to said transmission unit.

13. Device according to claim 1, wherein said second means of examination determines the state of the clutch via a position sensor.

14. A method of controlling a transmission unit during a malfunction of the transmission unit, the transmission unit including a clutch which receives mechanical power from an internal combustion engine, a gear shift input connected to an output of the clutch and which gear shift transmits mechanical power to the wheels of a vehicle, a first actuator coupled to the clutch to actuate the clutch and a second actuator coupled to the gear shift to carry out selection and engagement/disengagement of gears of the gear shift, an electronic control unit comprising a primary microprocessor which supplies control signals to the first and second actuators based on information received by said electronic control unit and an auxiliary microprocessor which backs up the primary microprocessor during a malfunction thereof, said method comprising the following steps:

detecting with said auxiliary microprocessor a malfunction of the primary microprocessor;

transferring control from the main microprocessor to the auxiliary microprocessor; and determining with said auxiliary microprocessor one of a clutch closed and a clutch at least partially open position which exists before the detection of the malfunction; and controlling by the electronic control unit said first and second actuators in a manner depending on whether the clutch is closed or at least partially open.

15. The method of claim 14, wherein the step of determining one of a clutch closed and a clutch at least partially open position comprises determining the clutch closed position, said method further comprising the step of maintaining the transmission unit in a condition existing before the detection of the malfunction.

16. The method of claim 15, further comprising the steps of:

comparing the speed of the vehicle to a threshhold value;

opening the clutch when the speed is below the threshhold value; and placing the gear shift into neutral.

17. The method of claim 14, wherein the step of determining one of a clutch closed and a clutch at least partially open position comprises determining the at least partially open position, said method further comprising the steps of fully opening the clutch and placing the gear shift into neutral.

* * * * *